United States Patent

Kelley et al.

[11] Patent Number: 5,613,405
[45] Date of Patent: Mar. 25, 1997

[54] CABLE ASSEMBLY WITH TELESCOPING CORE TERMINAL

[75] Inventors: Larry Kelley; Randy Watkins, both of Troy, Mich.

[73] Assignee: Teleflex Incorporated, Troy, Mich.

[21] Appl. No.: 556,705

[22] Filed: Nov. 13, 1995

[51] Int. Cl.$^6$ ........................................................ F16C 1/10
[52] U.S. Cl. ........................................ 74/502.4; 74/501.5 R
[58] Field of Search ................................ 74/502.4, 502.6, 74/502, 501.5 R

[56] References Cited

U.S. PATENT DOCUMENTS

| | | | |
|---|---|---|---|
| 4,304,148 | 12/1981 | Hamman | 74/502.4 |
| 4,658,668 | 4/1987 | Stocker | 74/502 X |
| 4,669,330 | 6/1987 | Stocker | 74/502.4 X |
| 4,738,155 | 4/1988 | Stocker . | |
| 4,829,845 | 5/1989 | Suzuki | 74/502.4 |
| 4,854,185 | 8/1989 | Lichtenberg et al. | 74/502.4 X |
| 4,869,123 | 9/1989 | Stocker | 74/502 X |
| 4,917,224 | 4/1990 | Gokee . | |
| 5,058,462 | 10/1991 | Killiany et al. . | |
| 5,107,720 | 4/1992 | Hatfield . | |
| 5,257,548 | 11/1993 | Pardy . | |
| 5,295,408 | 3/1994 | Nagle et al. . | |

Primary Examiner—Charles A. Marmor
Assistant Examiner—Mary Ann Battista
Attorney, Agent, or Firm—Howard & Howard

[57] ABSTRACT

A motion transmitting remote control assembly (10) includes a core terminal (20) composed of a slider (26) and a sleeve (46). Flexible cantilever fingers (48) extend from the sleeve (46) and are inserted into an aperture (22) in the top of an accelerator pedal (16). A compression spring (64) is disposed between the sleeve (46) and the slider (26) for providing over travel protection. Splines (42) are positioned along the slider (26) to support the sleeve (46) as it slides thereover during operation. The improvement of this invention resides in distal tips (50) of the fingers (48) which angle into a protective position seated behind the end stop flange (34) of the slider (26). This arrangement allows the end stop flange (34) to center the terminal (20) as it is pushed through the aperture (22) in the accelerator pedal (16), instead of using the fingers (48) to center the terminal (20), thereby reducing the potential for misalignment or incomplete connection. The fingers (48) readily expand over the end stop flange (34) during the initial assembly phase when the slider (26) is first coupled to the sleeve (46). The compression spring (64) forces the distal tips (50) of the fingers (48) into abutting contact with the end stop flange (34) and holds them in this position during subsequent connection to the accelerator pedal (16).

14 Claims, 2 Drawing Sheets

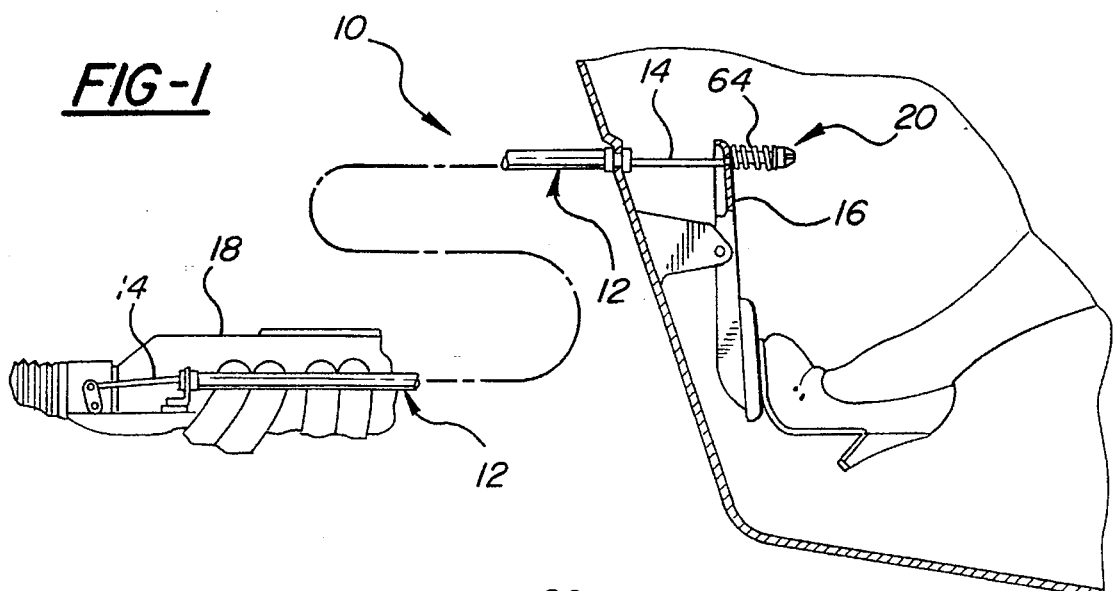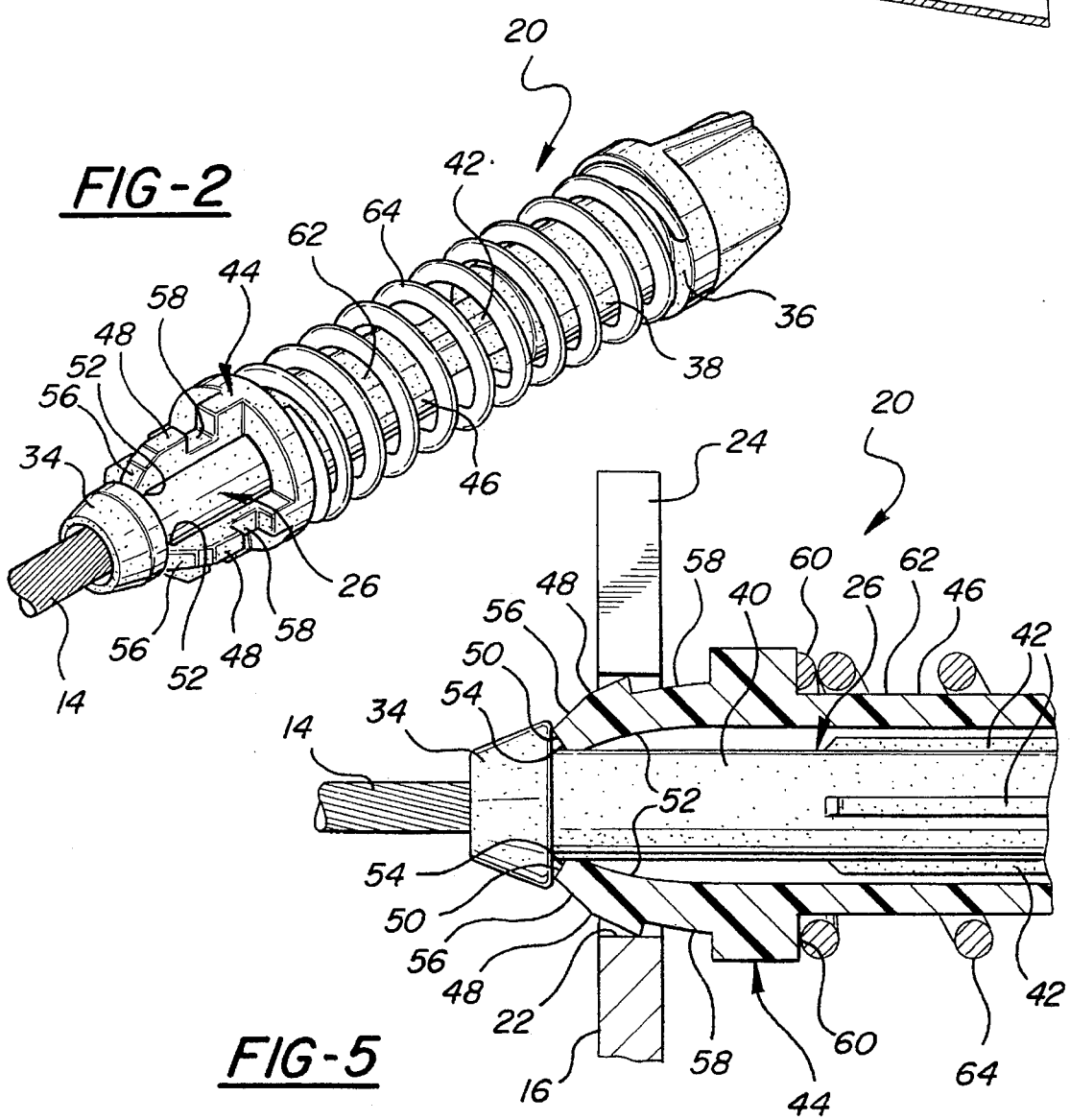

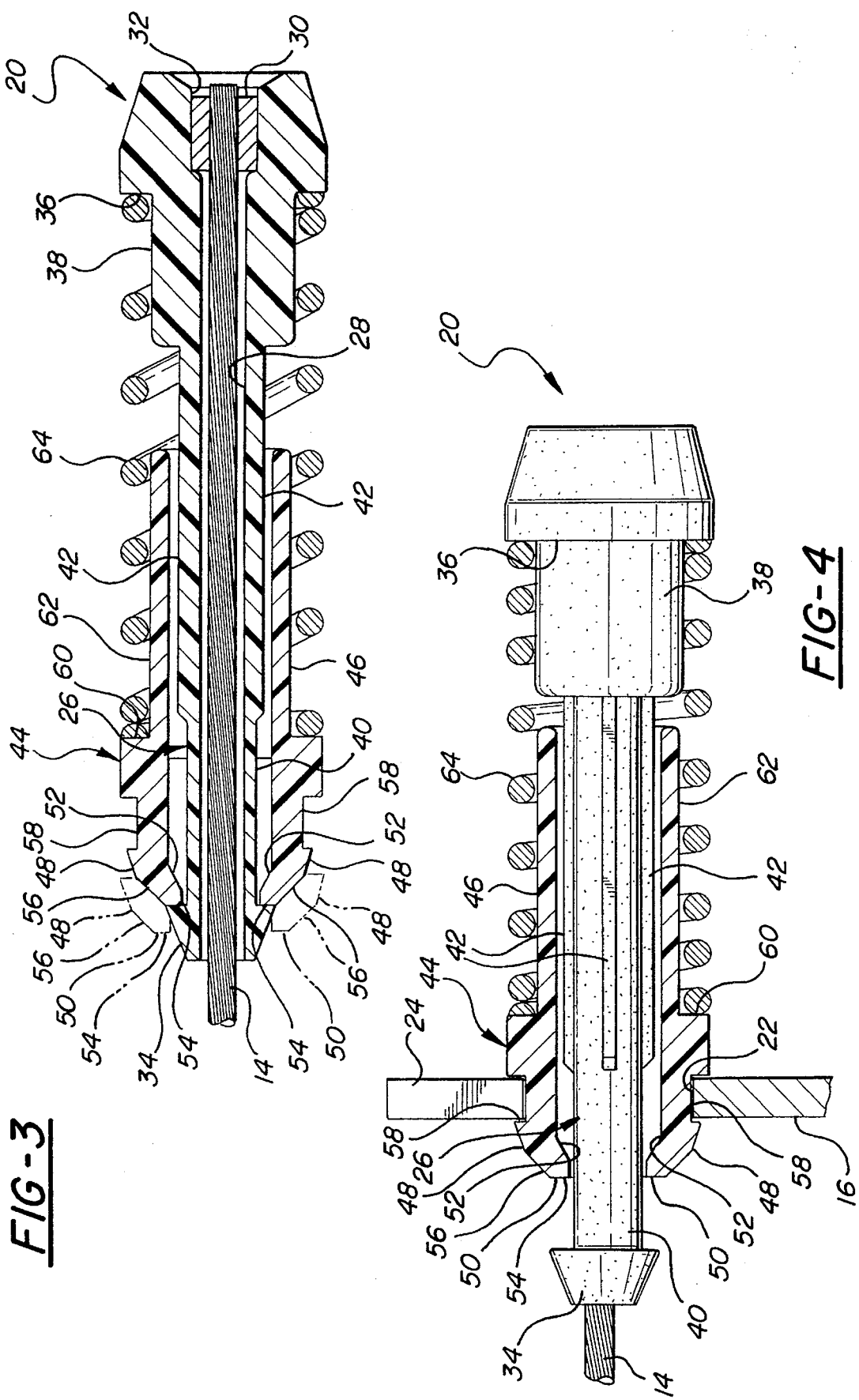

CABLE ASSEMBLY WITH TELESCOPING CORE TERMINAL

TECHNICAL FIELD

The subject invention relates to a motion transmitting remote control assembly of the type for transmitting forces along a curved path, and more particularly to an improved core element terminal therefor.

BACKGROUND OF THE INVENTION

Motion transmitting remote control assemblies of the type for transmitting motion in a curved path by means of a flexible motion transmitting core element are frequently used in applications to control the movement of something from a remote location. In the automotive industry in particular, transmissions, ventilation systems, fuel systems, hood releases and the like are frequently actuated by a motion transmitting remote control assembly from a remote actuating location. Such motion transmitting remote control assemblies include a protective sheath-like conduit which slidably supports an internal moving core element. The conduit is often of the composite type having an inner tubular liner defining the internal boundaries of a core passage, at least one metallic supportive lay wire wrapped helically about the liner, and an outer cover disposed about the lay wire.

The core element must be attached at each end to a control member. Various methods are employed for attaching the end of the core element to a control member, usually depending upon numerous important factors. Often, the control member is thin bodied, and connection with the core element is accomplished by a push-type fastening connection through an aperture in the thin bodied control member. For example, in the control of automotive throttles via a foot-actuated accelerator pedal, an aperture is provided near the top of the accelerator pedal, into which a terminal on the core element attaches. U.S. Pat. No. 4,738,155 to Stocker, issued Apr. 19, 1988, discloses a core element terminal adapted for attachment to the aperture in a thin bodied control member.

Proper and full engagement of the core element terminal with the control member is essential. As addressed in the Stocker patent, misalignment and incomplete engagement must be avoided. This is because it is common assembly line practice to hurriedly assemble the cable assembly in an automobile. For example, returning to the example of an automobile throttle control via an accelerator pedal, it is well known that assembly line workers typically align the components in their places and then rapidly and forcibly depress the accelerator pedal hoping that the core element terminal will properly seat in the aperture in the top of the accelerator pedal. However, depending upon the particular design of the terminal, misalignment and incomplete engagement may occur, resulting in a defective connection.

Additionally, it is sometimes necessary to incorporate within the core element terminal either an over-travel protection device or a length adjustment device. Both such devices are related in that relative movement is provided between a slider and some type of housing or attachment member. In the case of over-travel protection, relative movement is controlled by a spring. In the case of length adjustment, relative movement is only permitted during an initial adjustment phase at the time of assembly, and then the slider and housing or attachment member are locked together.

For example, U.S. Pat. No. 4,917,224 to Gokee, issued Apr. 17, 1990 and U.S. Pat. No. 5,058,462 to Killiany, et al., issued Oct. 22, 1991, both disclose over-travel protection devices for core element terminals. U.S. Pat. No. 5,295,408 to Nagle, et al., issued Mar. 22, 1994, discloses a core element terminal including a length adjustment feature. However, these prior art references are not capable of insuring consistently proper alignment and complete engagement with an aperture in a thin bodied control member during the normally rough assembly line practices.

SUMMARY OF THE INVENTION AND ADVANTAGES

The subject invention comprises a motion transmitting remote control assembly of the type for transmitting motion along a curved path. The assembly comprises a conduit and a core element slidably disposed in the conduit. The core element has at least one end extending from the conduit. A slider is operatively connected to the one end of the core element. The slider includes an end stop flange. An attachment means surrounds the slider and is axially moveable thereover for attaching the slider to an aperture in a thin bodied control member. The attachment means includes a plurality of resilient fingers for gripping the aperture. A coupling means is provided for limiting relative movement between the slider and the attachment means. The invention is characterized by each of the fingers having a distal tip angled inwardly toward and seated against the end stop flange of the slider so that the end stop flange forms a protective leading end to facilitate insertion through the aperture in the control member.

By protecting the distal tips of the fingers behind the end stop flange, it is assured that proper alignment will be maintained during the assembly process when the attachment means is connected to the aperture in the control member. This is true even if the assembly line practice is to simply align the attachment means with the aperture in the control member and then forcefully actuate the control member, such as by rapidly depressing an accelerator pedal.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a simplified diagrammatic view of a cable assembly according to the subject invention installed in an automobile between the accelerator pedal and the throttle valve;

FIG. 2 is a perspective view of the terminal;

FIG. 3 is a cross-sectional view of the terminal and showing in phantom the fingers of the terminal as they are expanded over the end stop flange during initial assembly;

FIG. 4 is a partial cross-sectional view of the terminal attached to an accelerator pedal and shown displaced in the an over-travel protection condition; and FIG. 5 is an enlarged fragmentary cross-sectional view showing the terminal as it is inserted through the aperture in the top of the accelerator pedal.

DETAILED DESCRIPTION OF THE PREFERRED EMBODIMENT

Referring to the Figures, wherein like numerals indicate like or corresponding parts throughout the several views, a motion transmitting remote control assembly is generally shown at 10. The assembly 10 is of the type including a flexible conduit, generally indicated at 12, having a pair of spaced apart ends. The conduit 12 is preferably of the composite type having an inner tubular liner defining the internal boundaries of a core passage, at least one metallic supportive lay wire wrapped helically about the liner, and an outer cover disposed about the lay wire. A flexible core element 14 is slidably disposed in the conduit 12. The core element 14 extends from both ends of the conduit 12 and attaches, respectively, to controlling and controlled members. For example, the controlling end of the core element 14 connected to an accelerator pedal 16 and the controlled end of the core element 14 may be connected to a throttle valve at an automobile engine 18. Of course, those skilled in the art will appreciate other uses of a motion transmitting remote control assembly which includes a conduit 12 and a core element 14, and that many various alternative configurations of the preferred embodiment disclosed herein are possible without departing from the invention as defined in the appended claims.

The core element 14 is connected to the accelerator pedal 16 using a terminal, generally shown at 20. The terminal 20 is of the type adapted to snap fit into an aperture provided at the top of the accelerator pedal 16. As is well known in the art, a typical such connection includes a circular aperture 22 at the top of the accelerator pedal 16, with a narrow slit 24 extending through to the top of the accelerator pedal 16. Connection of the terminal 20 to the accelerator pedal 16 is accomplished by tensioning the core element 14 over top of the accelerator pedal 16, and passing the bare core element 14 through the slit 24 until the terminal 20 is aligned with the aperture 22. The terminal 20 can then be forcibly pressed into the aperture 22, whereupon a snap fit connection occurs joining the components.

The terminal 20 includes a slider, generally indicated at 26, which is operatively disposed on the end of the core element 14. As perhaps best shown in FIG. 3, the slider 26 is provided with an inner core passage 28 through which the core element 14 is retained. A slug 30 on the end of the core element 14 is retained in a slug socket 32 in the inner core passage 28. In this manner, the slider 26 is capable of transmitting tensile loads only along the core element 14.

The slider 26 also includes a conically tapering end stop flange 34 at its leading end, i.e., the end which is inserted through the aperture 22 upon assembly with the accelerator pedal 16. At the opposite end of the slider 26, spaced from the end stop flange 34, is an annular first spring seat 36. A first spring support 38 extends axially from the first spring seat 36. A guide shank 40 extends between the end stop flange 34 and the first spring support 38. The guide shank 40 includes a plurality of splines 42 extending only partly along its length. As shown in FIGS. 3 and 4, the splines 42 terminate a good distance from the end stop flange 34 for reasons which will be addressed subsequently.

The terminal 20 also includes an attachment means, generally indicated at 44, which surrounds the slider 26 and is axially moveable thereover for attaching the slider 26 to the aperture 22. As best shown in FIGS. 2–4, the attachment means 44 is composed of two integral features, a sleeve 46 and a plurality of resilient fingers 48. Four such fingers 48 are provided in the preferred embodiment. The fingers 48 extend in cantilever fashion from the sleeve 46 and grip the inner surface of the aperture 22, as illustrated in FIGS. 3 and 4. Each finger 48 has a distal tip 50 which is angled or curled inwardly toward and seated against the end stop flange 34 so that the end stop flange 34 forms a protective leading end to facilitate insertion through the aperture 22 during assembly. In other words, by angling the distal tips 50 inwardly and protecting them behind the end stop flange 34, the terminal 20 is assured of consistently proper alignment and attachment with the aperture 22 in the accelerator pedal 16. Furthermore, each distal tip 50 includes an internal ramping surface 52 which rides over, in wedge-like fashion, the conically tapering end stop flange 34, as shown in phantom in FIG. 3, during the initial assembly phase when the attachment means 44 and slider 26 are coupled together. During this initial assembly phase, the fingers 48 are blossomed, or expanded outwardly from the sleeve 46, as they ramp over the end stop flange 34. Once the distal tips 50 of the fingers 48 have cleared the end stop flange 34, they resiliently snap back toward the guide shank 40, with squared abutting faces 54 of each engaging the rear side of the end stop flange 34 in surface-to-surface contact. This is the condition in which the assembly 10 is shipped.

After the assembly 10 reaches the automobile factory, it is assembled into a vehicle by an assembly line worker. When the terminal 20 is inserted through the aperture 22 by the assembly line worker, a tapering exterior surface 56 of each finger 48 first engages the inner edges of the aperture 22. Continued forceful insertion through the aperture 22 causes the fingers 48 to deflect inwardly, toward the guide shank 40, as shown in FIG. 5. The distal tips 50 are forced into bearing contact with the guide shank 40, while the mid portion of each finger 48, between the distal tip 50 and its connection to the sleeve 46, bows inwardly like a leaf spring. A notch 58 in each finger 48, which is dimensioned to coincide with the wall thickness of the accelerator pedal 16, is brought into interlock gripping engagement with the inner edges of the aperture 22, to lock the terminal 20 in place.

The sleeve 46 is a generally tubular member having an annular second spring seat 60 opposing the first spring seat 36, and a second spring support 62 extending axially rearwardly from the second spring seat 60. Preferably, the sleeve 46 and fingers 48 are integrally molded of plastic in an injection molding operation. Likewise, the slider 26 is preferably injection molded of plastic.

The terminal 20 also includes a coupling means 64 for limiting relative movement between the slider 26 and the attachment means 44. In the preferred embodiment illustrated in the accompanying figures, the coupling means 64 comprises a typical helical wound compression spring functioning as an over-travel protection device. However, those skilled in the art will readily appreciate that the coupling means 64 may take other and alternative forms, such as a length adjustment device or the like. As perhaps best shown in FIGS. 3 and 4, the compression spring has an internal diameter slightly greater than the outer diameter of the first and second spring supports 38, 62, respectively. In this manner, the compression spring is prevented from buckling as it is compressed during operation. Also, the spring supports 38, 62 help prevent noise.

In the normal operation and free state condition shown in FIG. 3, the distal tips 50 of the fingers 48 bear against the end stop flange 34 by way of the forwardly acting force exerted by the compression spring. The terminal 20 will operate in this condition until, as shown in FIG. 1, the accelerator pedal 16 is depressed beyond movement limits of the throttle valve at the engine 18. When this occurs, the core element 14 can no longer move, even though the accelerator pedal 16 will permit continued travel. To prevent over tension in the core element 14 and possible damage to the core element 14 and/or the terminal 20 due to over stress, the compression spring of the coupling means 64 will compress, as shown in FIG. 4, allowing the attachment means 44 along with the accelerator pedal 16 to travel relative to the stationery core element 14 and slider 26. When this occurs, the distal tips 50 of the fingers 48 are drawn away from the end stop flange 34. Stability is maintained in this situation by way of the distal tips 50 riding against the unsplined portion of the guide shank 40, while the splines 42 provide support to the inner portion of the sleeve 46.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A motion transmitting remote control assembly (10) for transmitting motion along a curved path including an over-travel protection device, said assembly (10) comprising: a conduit (12); a core element (14) slidably disposed in said conduit (12), said core element (14) having at least one end extending from said conduit (12); a slider (26) operatively disposed on said end of said core element (14), said slider (26) including an end stop flange (34); attachment means (44) surrounding said slider (26) and axially moveable thereover for attaching said slider (26) to an aperture (22) in a thin-bodied control member (16), said attachment means (44) including a plurality of resilient fingers (48) for gripping the aperture (22); a compression spring operatively disposed between said slider (26) and said attachment means (44); and characterized by said fingers (48) each having a distal tip (50) angled inwardly toward and seated against said end stop flange (34) for preventing disconnection of said attachment means (44) from said slider (26); said end stop flange (34) having a tapered protective leading end to facilitate insertion through the aperture (22) in the control member (16); said distal tip (50) of each of said fingers (48) including an internal ramping surface (52) deflectable over said tapered end stop flange (34) during initial assembly of said attachment means (44) and said slider (26).

2. An assembly (10) as set forth in claim 1 wherein said slider (26) and said attachment means (44) are fabricated from plastic.

3. An assembly (10) as set forth in claim 1 wherein each of said fingers (48) includes a notch (58).

4. An assembly (10) as set forth in claim 1 wherein said slider (26) includes an inner core passage (28).

5. An assembly (10) as set forth in claim 4 wherein said inner core passage (28) includes a slug socket (32).

6. An assembly (10) as set forth in claim 1 wherein said attachment means (44) includes a generally tubular sleeve (46) extending from said fingers (48).

7. An assembly (10) as set forth in claim 6 wherein said slider (26) includes an annular first spring seat (36) spaced from said end stop flange (34).

8. An assembly (10) as set forth in claim 7 wherein said sleeve (46) includes an annular second spring seat (60) opposing said first spring seat (36).

9. An assembly (10) as set forth in claim 8 wherein said distal tip (50) of each of said fingers (48) includes a squared abutting face (54) and a tapering exterior surface (56).

10. An assembly (10) as set forth in claim 9 wherein said slider (26) includes a first spring support (38) extending axially from said first spring seat (36).

11. An assembly (10) as set forth in claim 10 wherein said sleeve (46) includes a second spring support (62) extending axially from said second spring seat (60).

12. An assembly (10) as set forth in claim 11 wherein said slider (26) includes a guide shank (40) extending between said end stop flange (34) and said first spring support (38).

13. An assembly (10) as set forth in claim 12 wherein said guide shank (40) includes a plurality of splines (42).

14. A motion transmitting remote control assembly (10) for transmitting motion along a curved path including an over-travel protection device, said assembly (10) comprising: a conduit (12); a core element (14) slidably disposed in said conduit (12), said core element (14) having at least one end extending from said conduit (12); a slider (26) operatively disposed on said end of said core element (14), said slider (26) including a tapered end stop flange (34); a tubular sleeve (46) surrounding said slider (26) and axially moveable thereover; a plurality of resilient fingers (48) extending from said sleeve (46) for gripping an aperture (22) in a thin-bodied control member (16); a compression spring operatively disposed between said sleeve (46) and said slider (26); and characterized by said fingers (48) each having a distal tip (50) angled inwardly toward and seated against said end stop flange (34) for preventing disconnection of said sleeve (46) from said slider (26); said end stop flange (34) having a tapered protective leading end to facilitate insertion through the aperture (22) in the control member (16); said distal tip (50) of each of said fingers (48) including an internal ramping surface (52) deflectable over said tapered end stop flange (34) during initial assembly of said sleeve (46) and said slider (26).

* * * * *